United States Patent [19]

Stahl

[11] Patent Number: 5,155,887
[45] Date of Patent: Oct. 20, 1992

[54] CLIP

[75] Inventor: Heinz Stahl, Glattbach, Fed. Rep. of Germany

[73] Assignee: Emhart, Inc., Newark, Del.

[21] Appl. No.: 642,347

[22] Filed: Jan. 17, 1991

[30] Foreign Application Priority Data

Jan. 19, 1990 [DE] Fed. Rep. of Germany ... 9000563[U]

[51] Int. Cl.⁵ .......................... A44B 17/00; F16B 5/00
[52] U.S. Cl. ............................................ 24/297; 24/293
[58] Field of Search ............... 24/297, 293, 294, 295, 24/453, 573.1; 411/508, 57, 60, 548

[56] References Cited

U.S. PATENT DOCUMENTS

| 2,188,026 | 1/1940 | Wiley | 24/293 |
| 2,964,814 | 12/1960 | Parkin | 24/293 |
| 3,120,884 | 2/1964 | Cochran | 24/297 |
| 3,634,991 | 1/1972 | Barton, Jr. et al. | 24/297 |
| 3,977,048 | 8/1976 | Benedetti | 24/293 |
| 4,135,277 | 1/1979 | Taniai | 24/297 |
| 4,708,895 | 11/1987 | Mizusawa | 24/297 |

FOREIGN PATENT DOCUMENTS 3331241 3/1985 Fed. Rep. of Germany ........ 24/297

Primary Examiner—Victor N. Sakran
Attorney, Agent, or Firm—Spencer Smith

[57] ABSTRACT

In a clip for application to a longitudinal flange for mounting components such as trim strips having a component holding block (body) from which resilient fingers projecting away from an abutment protruding from the block are formed as upright arms which project from the block and are provided at their free ends with catching projections which, when they catch onto the longitudinal flange, press the upright arms round a bending zone extending in the transverse direction thereof away from the abutment.

3 Claims, 2 Drawing Sheets

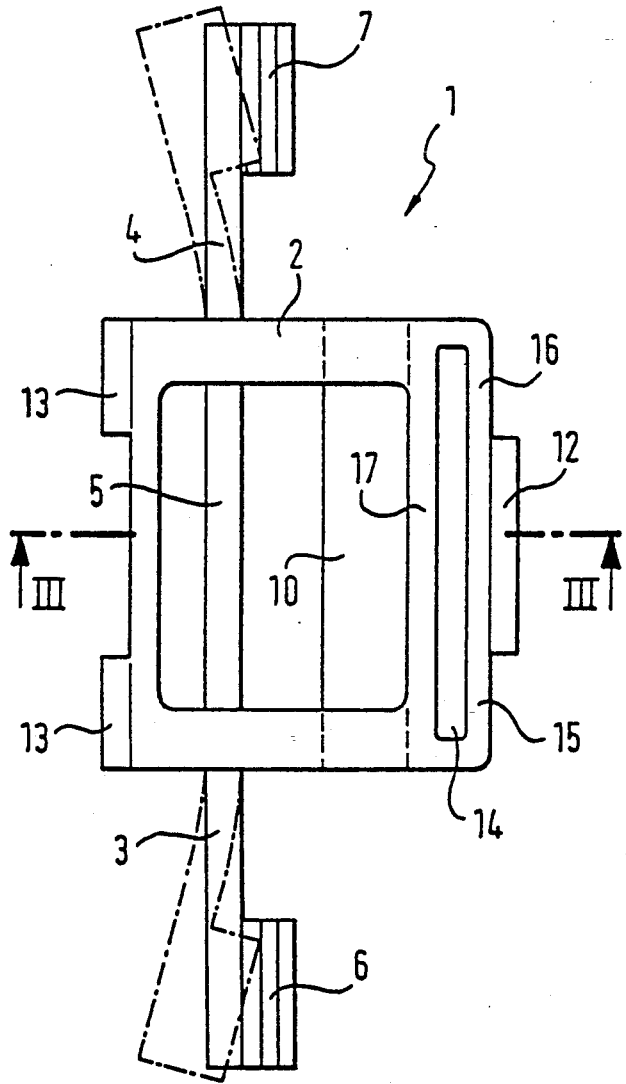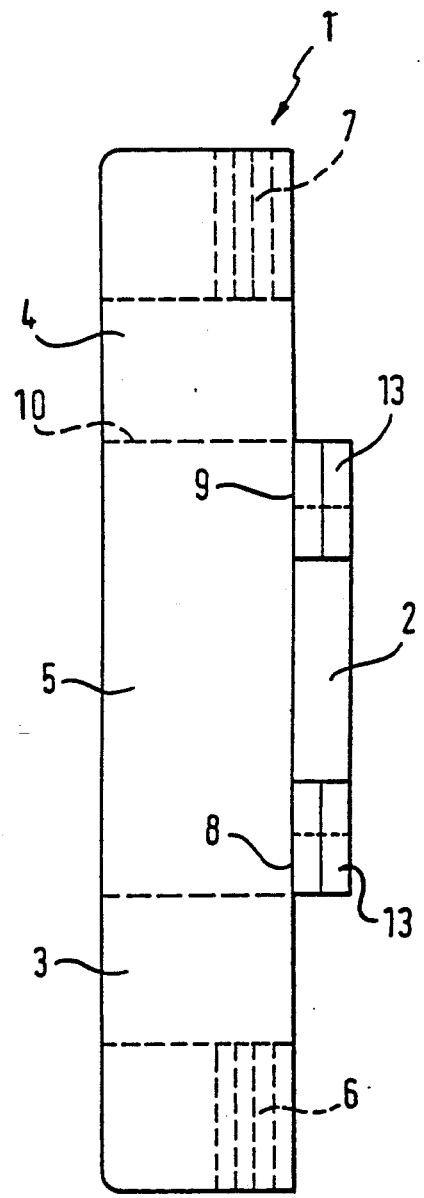

CLIP

BACKGROUND OF THE INVENTION

The invention relates to a clip to be applied on a longitudinal flange for the mounting of components, in particular ornamental strips, with a substantially rectangular block which holds the component and from which resilient fingers project in opposition to an abutment protruding from the block.

A clip of this type is already used in the car industry, more specifically for the mounting of decorative strips which cover roof channels provided in the roof of motor vehicles. In the known clips, two resilient fingers which are folded substantially into a U-shape and oppose an abutment are arranged next to one another. The resilient fingers and the abutment project substantially at right angels from the plane of the block and leave a free gap between themselves, in which the longitudinal flange penetrates when the clip is applied and on which flange the resilient fingers then cling. The resilient fingers and the abutment penetrate into the roof channel or into a channel extending next to the longitudinal flange parallel thereto, when the clip is applied to the longitudinal flange. Owing to the limited depth of the channel, only a relatively short length, in which the bending zone for the resilient finger is to be arranged, is available for the resilient fingers which have been folded into a U-shape. The bending zone must maintain a spring stroke for the resilient fingers, which is greater, the more the resilient fingers have to allow for tolerances with respect to the position of the longitudinal flange. This means that the resilient fingers are subjected to considerable bending stresses in the vertex region of their U-shaped course, and this can cause the resilient fingers to snap off when the clip is applied, particularly if the material has undesirable properties.

The object of the invention is to construct the clip described at the outset such that the risk of the resilient fingers snapping is avoided by desirable positioning of the bending zone.

BRIEF DESCRIPTION OF THE INVENTION

According to the present invention, this is achieved in that the resilient fingers are formed as upright arms which project from opposing sides of the block to extend with their transverse direction substantially perpendicularly to the block and are provided at their free ends with catching projections which, when they catch onto the longitudinal flange, press the upright arms round a bending zone extending in the transverse direction thereof away from the abutment.

The design of the resilient fingers as upright arms which extend roughly perpendicularly to the block and project from opposing sides of the block, initially produces a bending zone which extends substantially over the length of the upright arms and is therefore relatively long, moreover the design as upright arms gives the resilient fingers considerable stability so that the upright arms are subjected to no restrictions in principle with respect to their length as they project from opposing sides of the block, i.e. when ornamental strips are to be mounted, extend in the longitudinal direction thereof, in which sufficient room is available even for longer resilient fingers. This also affords the advantage that the length of the bending zone of the resilient fingers is not dependent on the depth of the respective channel. This allows a design of resilient fingers in which the resilient fingers can be given a correspondingly long bending zone, even in the case of greater spring travel, which virtually prevents the resilient fingers from snapping during normal use of the clip.

To allow tolerances with respect to the position of the longitudinal flange to be desirably compensated with the clip, the clip is designed such that the catching projects ascent stepwise. In this case, the resilient fingers can each engage with the catching projection on the longitudinal flange which corresponds to the position of the longitudinal flange.

A particularly sturdy design of the upright arms is obtained if the upright arms are constructed integrally as a continuous rib extending over the block. In this case, the upright arms receive additional reinforcement in their central region close to the side of the block so that the block is also given additional stability.

The block is preferably provided on the opposing sides, free from the upright arms, with catching lugs for the mountingh of an ornamental strip. With this construction, the block is initially engaged with its catching lugs in the ornamental strip with which the block is then caught on the longitudinal flange so that the ornamental strip is mounted on the longitudinal flange.

It should also be pointed out that the resilient fingers can project both outwardly and toward one another from the block, but the block must be at least twice as long as a resilient finger in the latter case. In this case, care should be taken to allow the resilient fingers to oscillate freely relative to the block with their ends carrying the catching projections so that they can recede and then engage accordingly when they are pressed onto a longitudinal flange.

It is to be noted that DE-Gbm 78 05 870.5 (G2657) discloses a clip which, for fixing an ornamental strip, a block is provided on the clip and is provided at one end with a catching lug and at its opposing end with two resilient fingers which are curved in the manner of horns and are constructed as horns which are round in cross section so as to be able to engage in a bend extending along the ornamental strip. This clip is not suitable for application to a longitudinal flange.

BRIEF DESCRIPTION OF THE DRAWINGS

In order that the present invention can be better understood, a preferred embodiment will now be described in greater detail by way of example with reference to the accompanying drawings in which:

FIG. 2 shows the clip in a view of its side facing an ornamental strip, FIG. 4 shows the clip in a section along the line III—III in FIG. 2.

DETAILED DESCRIPTION OF DRAWINGS AND PREFERRED EMBODIMENT

Figure 1:
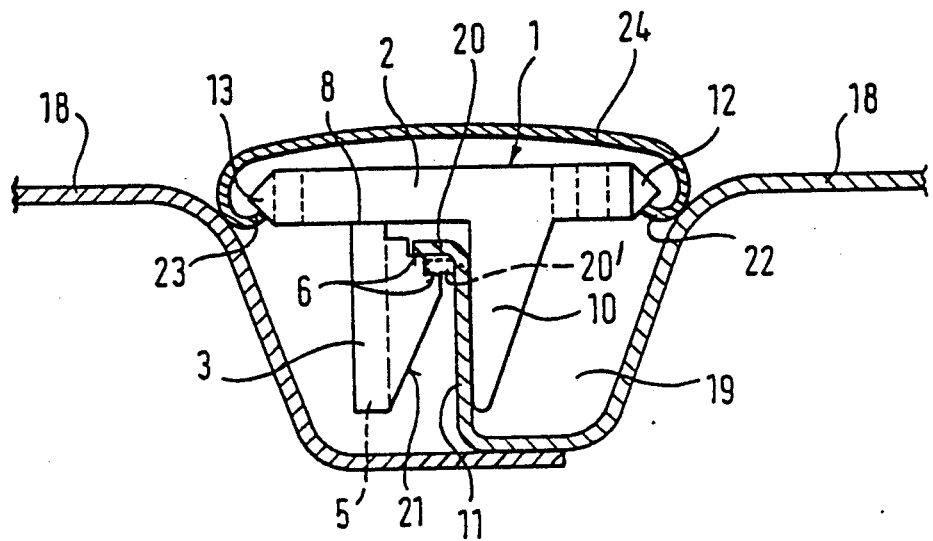
FIG. 1 shows the clip caught on a longitudinal flange, shown in section, in the roof channel of a motor vehicle, with an ornamental strip carried by the clip.
Figure 3:
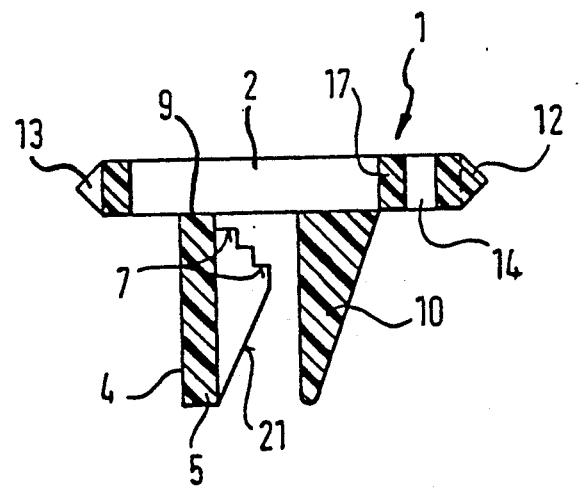
FIG. 3 shows the same clip rotated through 90° relative to FIG. 2.

The clip 1 shown in the drawings consists of the block 2 which is designed in the manner of a frame carrying the two resilient fingers 3 and 4 which, as shown in FIG. 4, are constructed as upright arms. In the embodiment illustrated, the resilient fingers 3 and 4 extend integrally as a continuous rib 5 over the block 2. Catching projections 6 and 7 are applied to the ends of the resilient fingers 3 and 4 and ascent stepwise in this case, further details of which will be given below in connection with FIG. 1. The resilient fingers 3 and 4 and the rib 5 are connected to the block 2 in that the upright arms forming the resilient fingers 3 and 4 and the rib 5 pass integrally into the material of the block 2 at positions 8 and 9. The resilient fingers 3 and 4 are opposed by the abutment 10 which, together with the catching projections 6 and 7, serves to form a free gap (see FIGS. 1 and 3) serving to receive the longitudinal Flange 11 which is illustrated in FIG. 1 and on which the clip 1 is to be applied. Further details of this will be given below. As the rib 5, the abutment 10 is constructed integrally with the block 2 so that the material of the abutment 10 passes into the material of the block 2. Owing to the design of the abutment 10, which is triangular in cross section, (see FIG. 3), the abutment 10 has considerable stability.

On the opposing sides of the block 2 which are free from the rib 5, there are arranged, integrally therewith, the catching lugs 12 and 13 which serve to mount a decorative strip, for example the decorative strip 24 shown in FIG. 1. In known manner, the catching lugs 12 and 13 have a triangular cross section (see FIG. 3) so that a resilient decorative strip can be pressed away over the catching lugs 12 and 13 and can then be secured by them. To prevent the catching of an ornmental strip from being dependent only on its inherent elasticity, the ornamental strip 24 is also given inherent elasticity by the provision, behind it and toward the inner part of the block 2, of a recess 14 which enables the catching lug 12 to recede elastically toward the abutment 10. In this arrangement, the connecting pieces 15 and 16 form elastic zones inside the block 2, which allow this yielding of the catching lug 12. The block 2 retains the stability required of it in that the recess 14 is held together toward the abutment 10 by the cross member 17.

The application of the clip 1 to the longitudinal flange 11 extending in the roof 18 of a car body, more specifically along the roof channel 19 inserted in the roof 18, will now be described with reference to FIG. 1. Roughly in the centre of this roof channel, the longitudinal flange 11 penetrates up in the roof channel and extends along the roof channel 19. The longitudinal flange 11 is provided for securing the attached clip, with the bend 20 of which the position can vary according to unavoidable production tolerances. A different position is shown in broken lines as bend 20' to demonstrate that a clip 1 which is to be caught onto the longitudinal flange 11 has to be adapted to different positions of the bend 20. The clip 1 shown caught on the longitudinal flange 11 in FIG. 1 lies with its abutment 10 on the side of the longitudinal flange 11 remote from the bend 20. A catching projection 6 is positioned behind the bend 20, allowing the resilient fingers 3 and 4 to be caught since they are provided with bevels 21 by means of which the resilient fingers 3 and 4 can recede when the clip 1 is pressed onto the longitudinal flange 11 with its bend 20, their design as upright arms assisting here. During the application process, the resilient fingers adopt the position indicated in do dash lines in FIG. 2 until, they jump back substantially in their original position when catching is complete and engage behind the bend 20 with their catching projections 6 which ascend stepwise. The stepwise ascent of the catching projections 6 allows tolerances with respect to the position of the bend 20 to be compensated (see bend 20' indicated in dot dash lines).

FIG. 1 also shows how an ornamental strip 24 is caught onto the clip 1 applied to the longitudinal flange 11. For this purpose, the ornamental strip 24 jumps with its turned in borders 22 and 23 behind the outermost positions of the catching lugs 12 and 13 so that the ornamental strip 24 is held securely owing to its inherent elasticity and the elasticity of the fixing of the catching lug 12.

I claim:

1. A molding clip to be attached to an upstanding panel flange having a horizontal top portion projecting from one side of the flange for securing a C-shaped molding strip to the panel comprising a horizontal body portion, an abutment portion depending from said body portion for engaging the other side of the flange, and a second portion depending from said body portion and including first and second resilient fingers projecting beyond the sides of said body portion and each including proximate the free end thereof and facing the flange upwardly inclined surface means for catching the end of the horizontal top portion of the flange at a location spaced from said body portion.

2. A molding clip according to claim 1 wherein said upwardly inclined surfaces means comprises a stair.

3. A molding clip according to claim 1 wherein said first abutment portion extends from one side of said body portion to the other side and said second depending portion is separated from said body portion in between said side portions thereof.

* * * * *